United States Patent
Gaß et al.

(10) Patent No.: US 11,776,407 B2
(45) Date of Patent: Oct. 3, 2023

(54) CARGO DETECTION SYSTEM AND METHOD FOR DETECTING OVERHANGING CARGO ON A MOTOR VEHICLE

(71) Applicants: HYUNDAI MOTOR COMPANY, Seoul (KR); KIA CORPORATION, Seoul (KR)

(72) Inventors: Lukas Gaß, Mainz (DE); Frank Wolf, Dreieich-Sprendlingen (DE); Martin Eschle, Idstein (DE); Michael Schreiber, Frankfurt am Main (DE); Seonok Lee, Rüsselsheim (DE); Saif Mudhafar, Wiesbaden (DE); Baris Dönmez, Stadtecken-Elsheim (DE); Holger Bartelmeß, Frankfurt am Main (DE); Dirk Kuxhausen, Alzenau Michelbach (DE); Ingmar Langer, Darmstadt (DE)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 139 days.

(21) Appl. No.: 17/405,601

(22) Filed: Aug. 18, 2021

(65) Prior Publication Data
US 2022/0366792 A1    Nov. 17, 2022

(30) Foreign Application Priority Data

May 12, 2021   (DE) .......................... 102021204841.2

(51) Int. Cl.
*G08G 1/16*     (2006.01)
*B60R 11/04*    (2006.01)
(Continued)

(52) U.S. Cl.
CPC ............. *G08G 1/168* (2013.01); *B60Q 9/008* (2013.01); *B60R 11/04* (2013.01); *G01S 13/42* (2013.01);
(Continued)

(58) Field of Classification Search
None
See application file for complete search history.

(56) References Cited

U.S. PATENT DOCUMENTS 10,507,766 B1 *  12/2019  Gable ..................... G01S 17/08
2021/0155264 A1 *  5/2021  MacPherson .......... B60J 5/0497

FOREIGN PATENT DOCUMENTS

DE    102018008996 A1 *  5/2019
DE    102019200241 A1 *  7/2020    ............... B60R 1/00
(Continued)

*Primary Examiner* — Fekadeselassie Girma
(74) *Attorney, Agent, or Firm* — LEMPIA SUMMERFIELD KATZ LLC (57) ABSTRACT

A cargo detection system for detecting overhanging cargo on a motor vehicle comprises a sensor system configured to provide cargo measurement data for cargo loaded onto the motor vehicle by measuring at least one of exterior dimensions of cargo protruding over an outer edge of the motor vehicle and an opening condition of a tailgate of the motor vehicle. The system further comprises a control device configured to assess, based on the cargo measurement data of the sensor system, whether cargo is overhanging from the motor vehicle and to calculate an updated vehicle length and/or vehicle width for the motor vehicle accounting for the overhanging cargo.

17 Claims, 4 Drawing Sheets

(51) Int. Cl.
  *G01S 13/42*    (2006.01)
  *G01S 15/42*    (2006.01)
  *B60Q 9/00*     (2006.01)
  *G01S 17/42*    (2006.01)
  *B60K 35/00*    (2006.01)
  *B60J 5/10*     (2006.01)
  *B60R 11/00*    (2006.01)

(52) U.S. Cl.
  CPC .............. *G01S 15/42* (2013.01); *G01S 17/42* (2013.01); *B60J 5/101* (2013.01); *B60K 35/00* (2013.01); *B60R 2011/004* (2013.01)

(56) References Cited

FOREIGN PATENT DOCUMENTS

| | | | |
|---|---|---|---|
| DE | 102021206428 | A1 * | 12/2022 |
| EP | 3081731 | A1 | 10/2016 |
| JP | 2002274445 | A * | 9/2002 |

* cited by examiner

CARGO DETECTION SYSTEM AND METHOD FOR DETECTING OVERHANGING CARGO ON A MOTOR VEHICLE

RELATED APPLICATION DATA

This patent claims the benefit of and priority to German Patent Application No. 102021204841.2 filed with the German Patent and Trade Mark Office on May 12, 2021. The entire contents of this prior filed application are hereby incorporated by reference herein.

TECHNICAL FIELD

The present disclosure pertains to a cargo detection system for detecting overhanging cargo on a motor vehicle, a motor vehicle with a cargo detection system, and a method for detecting overhanging cargo on a motor vehicle.

BACKGROUND

Motor vehicles are increasingly connected with sensors and telematics in order to implement advanced driver-assistance systems (ADAS) and/or autonomous driving functionalities. For example, cars may be provided with multiple sensors and various techniques for acquiring data from the environment. These provide accurate detection of other vehicles, pedestrians, obstacles, of the road ahead and/or behind, and so on. Typical technologies that are utilized for this purpose include radar, laser, lidar, infrared, ultrasonic, cameras, stereo vision, computer vision, odometry, accelerometers, gyroscopes, GPS, and so on. To produce a more consistent, accurate, and useful view of the environment, a variety of such sensors may be provided on a car and the information from these sensors may be combined within a sensor system. Data collected with such a sensor system may be used to avoid contact between the vehicle and other objects, for example, by warning a driver about an approaching object and/or by automatically steering the vehicle accordingly.

Sometimes long items are transported with vehicles that do not fit into a trunk and/or onto a cargo area of the respective vehicle. It may then become necessary to leave a tailgate of the vehicle at least partially open while driving and/or to drive the vehicle while the item is protruding over a bumper or other outer edge of the vehicle (for example, over a bottom hinged tailgate in the case of a pick-up truck). This may make driving more demanding, especially during parking maneuvers, because the vehicle with its load is physically longer by a length that may not be (precisely) known.

Parking sensors of vehicles are typically not calibrated for this additional overhang and might therefore provide imprecise or misleading information to the driver (as the vehicle is longer than assumed by the system). Moreover, parking sensors like ultrasonic sensors may be blocked by the loaded item and may thus deliver false alerts of obstacles seemingly behind the vehicle. In addition, rear view cameras may not be usable in a proper way in these instances, in particular when a rear view camera is mounted on the tailgate. Current vehicles are often already equipped with several other sensors in the rear, e.g. rear radar or lidar, which, however, are not used to measure a possible cargo overhang. Hence, parking assistance systems may not work optimally or may not work altogether even though they would be needed particularly urgent due to the unknown length of the vehicle.

Document EP 3 081 731 A1 describes a method for optimizing the exit from a vehicle during/after parking for passengers and objects, which reduces the risk of damage to the vehicle, for example, to enable opening of a trunk after parking.

SUMMARY

Hence, there is a need to find solutions for increasing safety and convenience while driving and/or parking with overhanging cargo.

To this end, the present disclosure provides a cargo detection system, a motor vehicle, and a method.

According to one aspect of the disclosure, a cargo detection system for detecting overhanging cargo on a motor vehicle comprises a sensor system configured to provide cargo measurement data for cargo loaded onto the motor vehicle by measuring at least one of exterior dimensions of cargo protruding over an outer edge of the motor vehicle or an opening condition of a tailgate of the motor vehicle. The cargo detection system further includes a control device configured to assess based on the cargo measurement data of the sensor system whether cargo is overhanging from the motor vehicle and to calculate an updated vehicle length and/or vehicle width for the motor vehicle accounting for the overhanging cargo.

According to another aspect of the disclosure, a method for detecting overhanging cargo on a motor vehicle comprises measuring, by a sensor system of the motor vehicle and/or an external measuring entity, at least one of exterior dimensions of cargo protruding over an outer edge of the motor vehicle or an opening condition of a tailgate of the motor vehicle. The method for detecting overhanging cargo further comprises assessing, by a control device of the vehicle, based on the cargo measurement data whether cargo is overhanging from the motor vehicle; and calculating, by the control device of the vehicle, an updated vehicle length and/or vehicle width for the motor vehicle accounting for the overhanging cargo.

According to yet another aspect, a motor vehicle comprises a cargo detection system according to the disclosure.

One benefit of the present disclosure is to use sensors to determine if a piece of cargo is overhanging from a vehicle and to correct the vehicle length and/or width on the basis of the result. Sensors may be particularly provided on the vehicle for this purpose. However, sensors already existing on the vehicle for other purposes may be utilized, for example, rear view cameras, ultrasonic sensors, and/or radar/lidar systems that are already integrated in the vehicle as part of other systems. In principle, sensor information from external entities may be used, e.g. recorded by other vehicles or by equipment in the surrounding infrastructure.

The updated vehicle dimensions may then be fed to parking assistants or other systems of the respective vehicle to account for the length and/or width of cargo protruding from the vehicle. Moreover, the results may be directly communicated to a driver or passenger of the vehicle, for example, to inform him or her about the load situation of the vehicle and/or to take appropriate precautions during driving and/or parking. As a result, driving safety may be increased on a general level, in particular because drivers may be supported by the system during particularly difficult driving maneuvers, for example, parking situations, and/or may be informed in advance that the load situation of the vehicle may be problematic.

It is understood that the term "vehicle" or "vehicular" or other similar term as used herein is inclusive of motor vehicles in general. Such motor vehicles include passenger automobiles including sports utility vehicles (SUV), buses, trucks, various commercial vehicles, and the like. Such motor vehicles also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, vehicles that are both gasoline-powered and electric-powered.

Advantageous embodiments and improvements are found throughout the present disclosure.

According to an embodiment, the sensor system may be configured to measure the exterior dimensions of cargo protruding over a cargo area, a trunk, a tailgate, and/or a bumper of the motor vehicle.

For example, transportation of bulky cargo may make it impossible to drive a vehicle with a fully closed tailgate. Instead, the tailgate may be left partially or completely open while the cargo is overhanging from a trunk of the vehicle and protruding from a bumper of the vehicle. The cargo overhang distance with an open tailgate may be calculated with reference to the outer edge of the bumper and may then be added to the overall vehicle length to ensure a correct estimation of the vehicle length, e.g. for parking assistant systems.

Depending on the type of vehicle and the application, different definitions of the protrusion length or cargo overhang may be employed. In one example, the overhang may be calculated from an outer edge of the bumper (e.g. in case of a limousine with opened tailgate). In another example, the overhang may be calculated from an outer edge of a bottom hinged tailgate (e.g. in the case of a pick-up truck with a tailgate swung open where the vehicle systems are already aware of the opened tailgate and are already taking the additional length of the dropped tailgate into account).

According to an embodiment, the opening condition may comprise an opening angle of the tailgate.

For example, a dedicated angle sensor installed on or at the tailgate may be used to measure the opening angle of the tailgate relative to the body of the vehicle. Alternatively, or additionally, the opening angle may be obtained from a powered tailgate system of the vehicle. As the dimensions of the tailgate may be known on the basis of the vehicle type and configuration, an additional length of the vehicle due to the opened tailgate may be calculated and used for an improved estimation of the actual vehicle length.

According to an embodiment, the control device may be configured to estimate a blind spot region at a distal end of the overhanging cargo based on a field of view of the sensor system and add a corresponding blind spot extension to the updated vehicle length and/or vehicle width.

For example, in the case of a load consisting of several pieces of cargo of varying lengths that are stacked over each other, e.g. stacked packages, boards etc., the uppermost piece may block the line of sight of a camera or other sensor. Due to this, a distal end of the load, e.g. a lower part of the cargo, may not be visible for the sensor and thus a blind spot and/or blind region may occur. This can result in an incorrect estimation and/or calculation of the protrusion length and/or overhang length of the load.

However, based on simple geometric calculations accounting for the configuration of the vehicle, the field of view of the sensor, and the visible part of the cargo, an estimate of the further parts of the cargo that are not visible for the sensor may be drawn up. On that basis, an upper limit on the size of the concealed region, i.e. the blind spot region, may be provided that can then be used to increase the estimated vehicle length (or width) by a corresponding amount representing the unknown size of the part of the cargo that is not directly visible.

According to an embodiment, the sensor system may comprise a camera, a radar, an ultrasonic sensor, and/or a lidar.

For example, the sensor(s) may be a stereo camera, a lidar and/or a radar, or other adequate device, which is able to measure dimensions within a range of approximately up to 3000 mm. It may be possible to employ sensors for this purpose that are provided on the vehicle for other applications case, e.g. for assisted and/or autonomous driving applications.

According to an embodiment, the sensor system may be mounted at the cargo area, the trunk, the tailgate, and/or the bumper of the motor vehicle.

The sensor(s) may be generally placed in any suitable area close to the outer or inner tailgate (or the cargo area) of the vehicle, e.g. at a similar position as conventional rear view cameras. The sensor position may be particularly chosen such that it faces a lower rear part of the vehicle (e.g. a bumper area). Typical suitable operation ranges may be roughly 50 mm to 1000 mm or up to 3000 mm for longitudinal protrusions and may be roughly 50 mm to 750 mm or up to 1500 mm for lateral protrusions.

According to an embodiment, the sensor system may be configured to measure a protrusion length of the overhanging cargo of at least up to 3 m. Similarly, the sensor system may be configured to measure a protrusion width of the overhanging cargo of at least up to 1.5 m.

The laws and regulations for driving with an open tailgate and an overhanging load may vary from country to country. For safety reasons, the maximum protruding length of overhanging cargo is typically limited to a certain size, e.g. below 1.5 m for general driving or below 3 m for short drives of less than 100 km. Depending on the length of the cargo, it may be additionally required to mount a reflector or other warning device at the rear end of the cargo, e.g. for all loads protruding for more than 1 m.

Hence, the system may be configured to provide accurate measurements within these typical ranges and may furthermore be adapted to distinguish different cases from each other, e.g. below 1 m, between 1 m and 1.5 m, between 1.5 m and 3 m and above 3 m.

According to an embodiment, the system may further comprise a communication device configured to receive cargo measurement data recorded by an external measuring entity for the cargo loaded onto the motor vehicle via vehicle-to-everything (V2X) communication. The method may correspondingly comprise receiving cargo measurement data recorded by the external measuring entity for the cargo loaded onto the motor vehicle via V2X communication.

Hence, besides integrated sensors that are mounted on the respective vehicle, length and width information may also be acquired via car-to-car and/or car-to-infrastructure communication.

For example, motor vehicles are increasingly equipped with various kinds of sensors that are capable of gathering distance/depth information (e.g. radar or lidar). In the case where the vehicle is trailed by another vehicle equipped with such systems, then the trailing vehicle may measure the overhanging cargo of the vehicle driving in the front, for example, during driving or when waiting at a traffic light, by comparing the distance between both vehicles and the rear end of the cargo and the trailing vehicle. The trailing vehicle may send the corresponding information to the leading vehicle via a wireless communication network.

In another example, sensors distributed over the infrastructure may be used to send length/width information of protruding cargo to the vehicle via wireless networks. Sensors may, for example, be installed at an intersection, e.g. at the traffic lights or street lamps. Such sensors and other sensors in a smart infrastructure environment could be used to provide information about the length and width of overhanging loads. The data could be sent to the vehicle via standardized protocols. Such external sensors would have an advantage that they would have no blind spot and could therefore provide precise measurements for all types of cargo. These systems could also be used to verify and improve the measurements done by the vehicle itself, e.g. to resolve a blind region of the sensor system of the vehicle.

According to an embodiment, the system may further comprise a driver interface configured to provide a cargo advice signal based on the updated vehicle length and/or vehicle width. The method may correspondingly comprise providing the cargo advice signal based on the updated vehicle length and/or vehicle width.

For example, the system may identify a protruding length between 1.0 m and 1.5 m. In that case, the driver may be reminded by a corresponding communication or signal to install a reflecting device at the end of the overhanging cargo to warn the other traffic participants about the increased length of the vehicle.

As another example, the system may identify a protruding length between 1.5 m and 3 m and may inform the driver accordingly that he or she may only drive up to a maximum of 100 km with this load condition.

In yet another example, the system may determine a cargo length above the limit allowed by the respective law (e.g. 3 m) and may warn the driver about this fact and/or may directly block usage of the vehicle.

According to an embodiment, the motor vehicle may comprise a parking assistant configured to use the updated vehicle length and/or vehicle width as input.

Hence, the parking assistant may base its driving recommendations and/or driving assistance or its automatic driving commands on this improved knowledge of the actual dimensions of the vehicle including overhanging cargo.

The disclosure is explained in greater detail with reference to exemplary embodiments depicted in the drawings as appended.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and together with the description serve to explain the principles of the disclosure. Other embodiments of the present disclosure and many of the intended advantages of the present disclosure should be readily appreciated as they become better understood by reference to the following detailed description. The elements of the drawings are not necessarily to scale relative to each other. In the figures, like reference numerals denote like or functionally like components, unless indicated otherwise.

Although specific embodiments are illustrated and described herein, it should be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

DETAILED DESCRIPTION OF THE EMBODIMENTS

Figure 1:
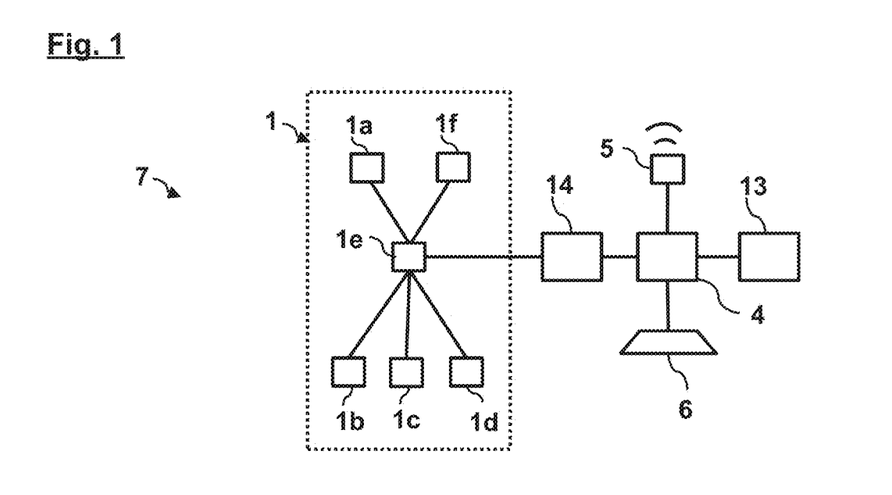
FIG. 1 schematically depicts a cargo detection system for detecting overhanging cargo on a motor vehicle according to an embodiment of the present disclosure.
Figure 2:
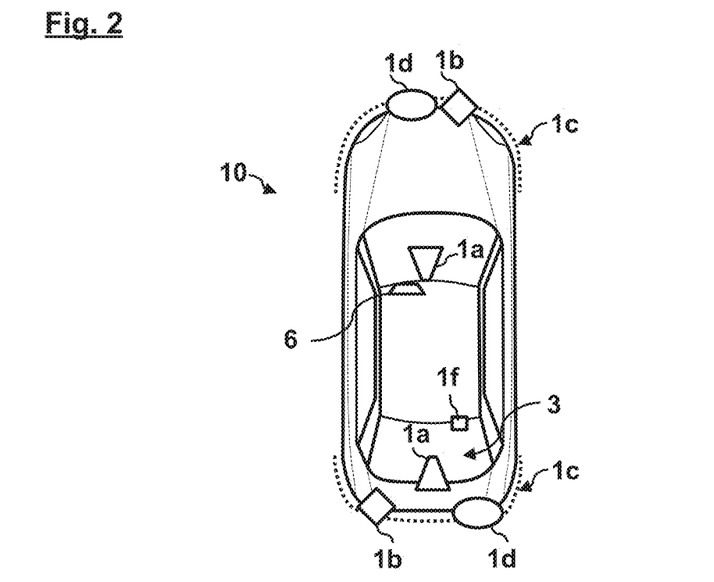
FIG. 2 schematically shows a motor vehicle comprising the cargo detection system of FIG. 1.
Figure 3:
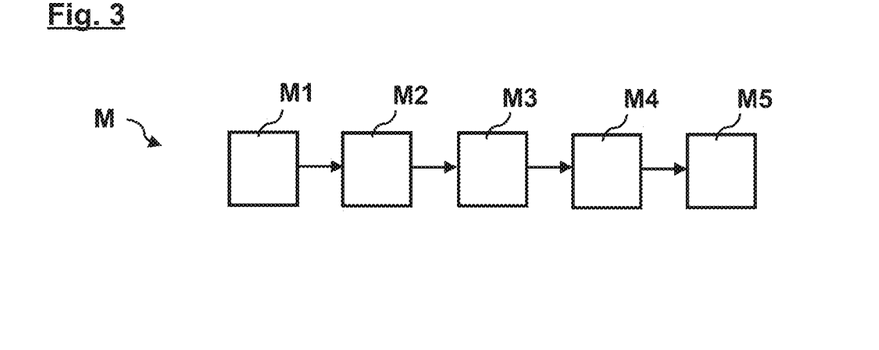
FIG. 3 shows a flow diagram of a method for detecting overhanging cargo on the motor vehicle of FIG. 2 using the cargo detection system of FIG. 1.

FIG. 1 schematically depicts a cargo detection system 7 for detecting overhanging cargo on a motor vehicle 10 according to an embodiment of the disclosure. FIG. 2 depicts a motor vehicle 10 having the system 7 of FIG. 1, e.g. an automobile. FIG. 3 shows a flow diagram of a method M for detecting overhanging cargo on the motor vehicle 10 of FIG. 2 using the cargo detection system of FIG. 1.

Figure 4:
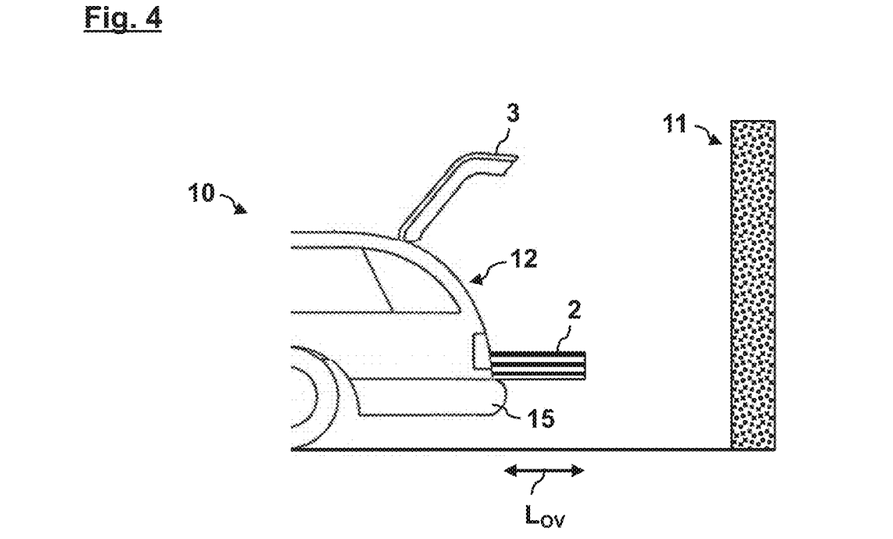
FIG. 4 shows the vehicle of FIG. 2 in a side view with a fully opened tailgate and overhanging cargo.
Figure 6:
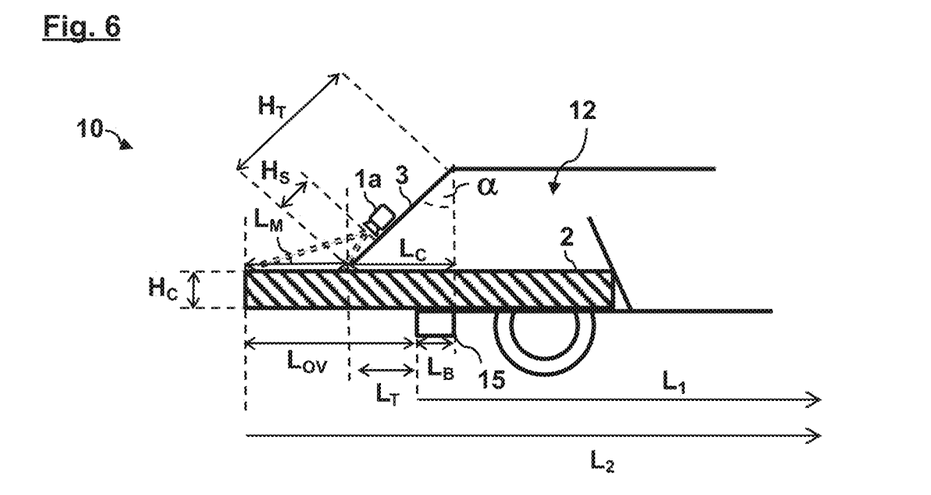
FIG. 6 shows a detailed view of the vehicle of FIG. 2 with a partially closed tailgate and overhanging cargo, including relevant parameters for calculating a vehicle length accounting for the overhanging cargo.

The system 7 is provided to support the operator of the vehicle 10 when transporting bulky cargo 2 that is too large or too long to fit into a trunk 12 (e.g. in the case of a limousine, sedan, or the like) or onto a cargo area (e.g. in the case of a pick-up truck, sport utility vehicle, or the like) of the vehicle 10 (see FIG. 4 for example). The cargo 2 may then only be transported by leaving the vehicle's tailgate 3 partially or completely open and/or by letting the cargo 2 protrude over an outer edge of the vehicle 10, e.g. over a cargo area, over a bumper 15, etc. FIG. 4 shows an example, in which the tailgate 3 of the vehicle 10 is completely open. FIG. 6, on the other hand, shows the vehicle 10 with a partially opened tailgate 3, the tailgate 3 resting on the cargo 2 thereby securing the cargo 2 between the tailgate 3 and the trunk bottom.

An underlying purpose of the present system 7 is to determine the presence of such overhanging cargo 2 and to provide an estimation for the actual vehicle length and/or width accounting for the additional length and/or width due to the protruding cargo 2. This information can then be used, for example, to provide updated vehicle dimensions to another system of the vehicle 10, i.e., to a parking assistant 13, which may then provide more precise driving/parking recommendations and/or steering commands.

The protrusion length $L_{OV}$ and/or width of the cargo 2 may be measured in two alternative ways, which also may be combined with each other. One way is by using a sensor system 1 of the vehicle 10 and/or the other ways is by acquiring data from an external measuring entity 9 (e.g.

another vehicle or sensors distributed over the surrounding infrastructure like buildings, signaling devices, etc.).

Referring now to FIGS. 1 and 2, the cargo detection system 7 comprises a sensor system 1 configured to provide cargo measurement data for cargo 2 loaded onto the motor vehicle 10. The sensor system 1 comprises in this embodiment a variety of different sensor technologies as they are utilized in modern vehicles, i.e., in assisted and/or autonomous driving systems, e.g. sensors to sense other vehicles, pedestrians, bicycles and other traffics participants, and/or objects.

The sensor system 1 shown in FIGS. 1 and 2 comprises two cameras 1a (e.g. a front and a rear view camera), several radars 1b, e.g. short-range and/or long-range radars, ultrasonic sensors 1c as well as lidars 1d, and an angle sensor 1f. However, a person of ordinary skill in the art may provide the vehicle 10 with other sensors depending on the particular application at hand. Furthermore, different sensor technologies and arrangements may be employed. The sensors may be custom designed for the present use or case but may also be used at the same time for various other purposes and systems within the vehicle 10.

As can be seen in FIG. 1, the sensors are controlled together by a sensor control unit 1e, which in turn is communicatively coupled to a determination unit 14 of the cargo detection system 7, e.g. a microprocessor and/or computer system, which is configured to assess and analyze the cargo measurement data acquired with the sensor system 1. The determination unit 14 then transfers the results to a control device 4 of the cargo detection system 7. The control device 4 is configured to assess, based on the cargo measurement data of the sensor system 1, whether cargo 2 is overhanging from the motor vehicle 10 and to calculate an updated vehicle length and/or vehicle width for the motor vehicle 10 accounting for the overhanging cargo 2. The following embodiments focus on calculating an updated vehicle length as an example. It should be clear to a person of ordinary skill in the art, however, that also a change in the width of the vehicle due to overhanging cargo could be determined in a similar vein.

The control device 4 is communicatively coupled to various subsystems of the vehicle 10. The subsystems may include, amongst others, a communication device 5 (e.g. for wireless V2X communication, i.e., vehicle-to-vehicle V2V or vehicle-to-infrastructure V2I communication), a driver interface 6 (e.g. a display inside a passenger cabin of the vehicle 10), and a parking assistant 13. The parking assistant 13 may be part of and/or coupled to an assisted/autonomous driving system of the vehicle 10.

The driver interface 6 may be configured to provide a cargo advice signal based on the updated vehicle length and/or width. Thus, the driver may be informed by the driver interface 6 that the actual protrusion length $L_{OV}$ or width of the load may require the driver to attach warning equipment like warning panels or the like at a distal end of the load in order to warn other traffic participants of the extended dimensions of the vehicle 10.

The parking assistant 13 on the other hand may use the updated vehicle length and/or width provided by the control device 4 as input in order to provide more accurate and correct parking assistance to a driver of the vehicle 10. This is particularly relevant in the case of parking maneuvers, which can get extremely demanding due to overhanging cargo 2. Thus, in order to avoid collisions with any obstacles 11, a precise knowledge of the exact dimensions of the overhanging cargo 2 may be crucial. The present system 7 thus helps to increase driving safety by adjusting parking assistants with automatically measured cargo overhang and support the driver in difficult parking situations.

To ensure this, the sensor system 1 is configured to measure exterior dimensions of cargo 2 protruding over an outer edge of the motor vehicle 10, e.g. the bumper 15, the trunk 12, and/or the tailgate 3 of the vehicle 10. The sensor system 1 is moreover configured to measure an opening angle α of the tailgate 3 with the angle sensor 1f. The latter may be integrated, for example, in the tailgate 3 of the vehicle 10 as part of an electrically operated tailgate system.

To provide sufficiently precise measurement data, the sensors of the sensor system 1 may be based on adequate technologies. For example, the cameras 1a may be high-definition stereo cameras or similar. The sensors can be placed in any adequate area of the outer or inner tailgate 3 of vehicle 10 in particular, e.g. at a similar position as conventional rear view cameras. In the present example, the sensor position should allow to face the lower rear part of the vehicle 10 (bumper area). However, the position and orientation of the sensors may be configured otherwise by a person of ordinary skill in the art depending on the vehicle. Suitable operating/measuring ranges would be approximately up to 3000 mm in length and approximately up to 1500 mm in width or less, e.g. below 1000 mm in length and below 750 mm may be sufficient for many applications.

For an exact calculation of the protruding dimensions, the actual opening angle α of the (not fully closed) tailgate 3 may be measured. That value can be delivered, for example, by power-tailgate software (if applied) or may be generated by an adequate separate device (in particular any ready-to-use solution, which may span magnetic sensors, current sensors, pressure sensors, acoustic sensors, 3D image sensors, radar sensors, angle sensors and so on). The sensors can be placed near a hinge of the tailgate 3 for example. Practical ranges for operation/measurements may be between α=0° (fully closed) and fully opened tailgate position (e.g. α=90°).

Figure 5:
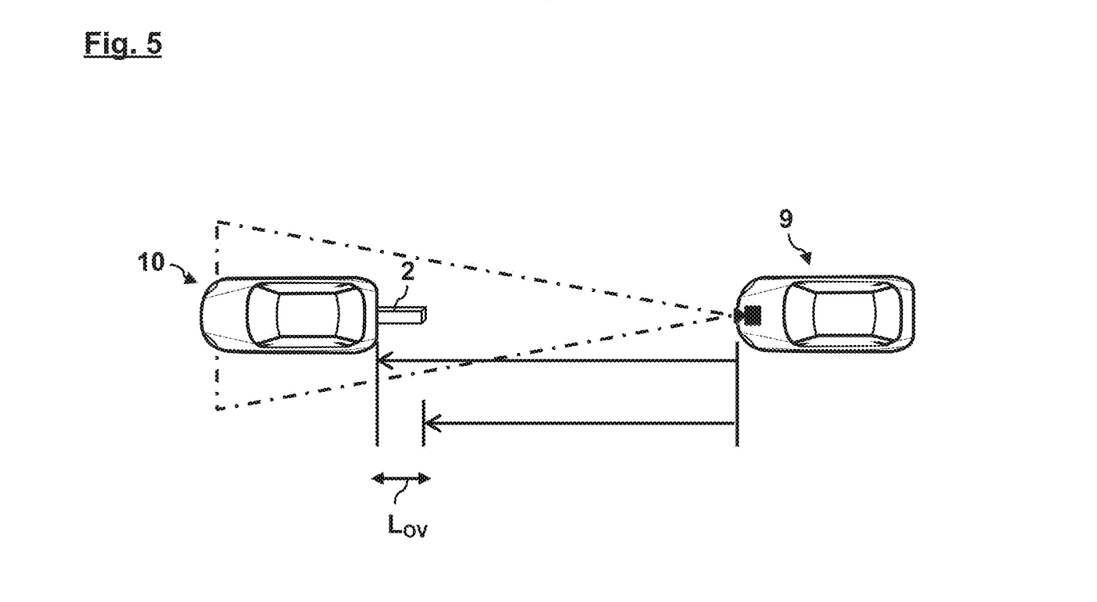
FIG. 5 shows the vehicle of FIG. 2 driving with overhanging cargo in front of another vehicle.

To complement such measurements of the sensor system 1, external measuring entities 9 can be employed. In the example of FIG. 5, another vehicle follows the present motor vehicle 10 loaded with the overhanging cargo 2. The other vehicle may serve as the external measuring entity 9 in this case, as its sensors (e.g. front camera, radar, lidar etc.) may provide an independent measurement of the protruding cargo 2. Depending on the relative position and orientation, the external measuring entity 9 may be able to provide a more precise estimation of the protrusion length $L_{OV}$ and/or width or general shape of the cargo 2 because it may be able to clearly see the cargo. The vehicle-installed sensor system 1 on the other hand may have certain limitations, because depending on the specific sensor arrangement and cargo, some portions of the cargo may not be visible for some or all sensors, thus leaving a blind spot in the field of view of its sensors. This means that the sensor system 1 of the vehicle may not be able to resolve the complete overhanging cargo 2 in all cases (e.g. because part of the cargo 2 is blocked from view of a rear view camera).

In other embodiments, different types of sensors mounted within the vicinity of the motor vehicle 10 may be used for the above purpose. For example, the sensors in a smart infrastructure environment can potentially be used to provide information about the dimensions of overhanging cargo. In all cases, the data may be exchanged with the motor vehicle 10 via wireless networks.

A corresponding method M as shown in FIG. 3 comprises under M1 measuring the exterior dimensions of cargo 2 protruding over an outer edge of the motor vehicle 10 and/or an opening condition of a tailgate 3 of the motor vehicle 10. The method M further comprises under M2 assessing based on the cargo measurement data whether cargo 2 is overhanging from the motor vehicle 10. For example, it may be established that the tailgate 3 is open, which may already be used as an indicator that cargo 2 is overhanging from the vehicle 10. The method M further comprises under M3 calculating an updated vehicle length and/or vehicle width for the motor vehicle 10 accounting for the overhanging cargo 2. The method M may further comprise under M4 receiving cargo measurement data recorded by the external measuring entity 9 for the cargo 2 loaded onto the motor vehicle 10 via V2X communication. The method M may further comprise under M5 providing a cargo advice signal based on the updated vehicle length and/or vehicle width.

Coming now to FIGS. 6-10, a few examples are provided on how the sensor system 1 may be used to measure and/or estimate the dimensions of overhanging cargo 2.

The calculation of total vehicle length $L_2$ as shown in FIG. 6 including cargo overhang (protrusion length $L_{OV}$) is essential for providing full functionality of the parking assistant 13. FIG. 6 shows a camera 1a, which is mounted on the tailgate 3 of the vehicle 10 at a certain height $H_S$. The tailgate 3 is in an open position with a certain opening angle $\alpha$. The camera 1a thus is able to measure only part of the length of the cargo 2 (see $L_M$ in FIG. 6). However, as the opening angle $\alpha$ of the tailgate 3 is also measured, the distance between the open tailgate 3 and the trunk 12 may be calculated from the known dimensions of the tailgate 3 (see $L_C$ in FIG. 6). Taking further into account the known position and extension of the bumper 15, the protrusion length $L_{OV}$ of the cargo 2 may be calculated. In addition, the cargo height $H_C$ may also be calculated as follows:

$$L_C = H_T * \sin(\alpha)$$

$$L_T = L_C - L_B$$

$$L_{OV} = L_M + L_T$$

$$L_2 = L_1 + L_{OV} = \text{total vehicle length with protruding cargo}$$

$$H_C = H_T - H_T * \cos(\alpha)$$

Figure 7:
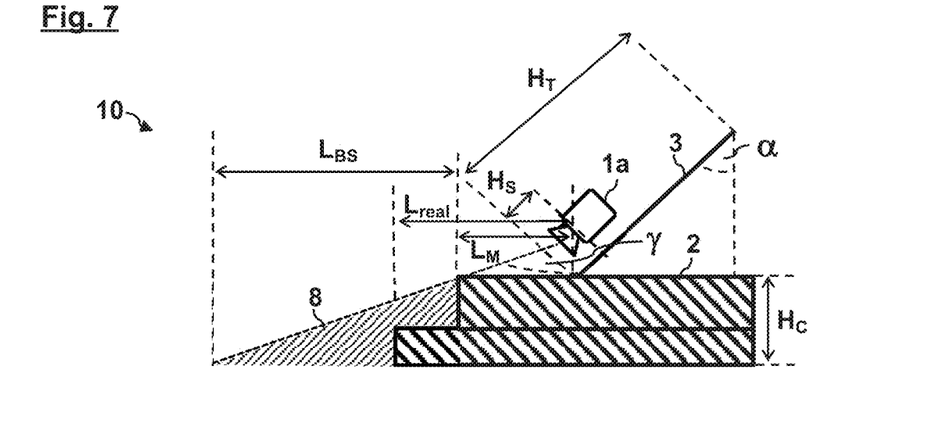
FIGS. 7 and 8 show a detailed view of the vehicle of FIG. 2 with a partially closed tailgate and various overhanging loads and relevant parameters for estimating a blind spot region of the overhanging load.

In the case of loads with varying lengths (e.g. stacked packages), the uppermost part of the load may block the viewing angle of the camera 1a on the tailgate 3 (cf. FIG. 7). Hence, a blind spot or blind region 8 may occur, which makes a lower part of the cargo 2 practically invisible for the sensor system 1 (if no additional sensors are installed on the vehicle 10 that compensate for this and/or an external measurement is done to resolve the blind spot).

Figure 8:
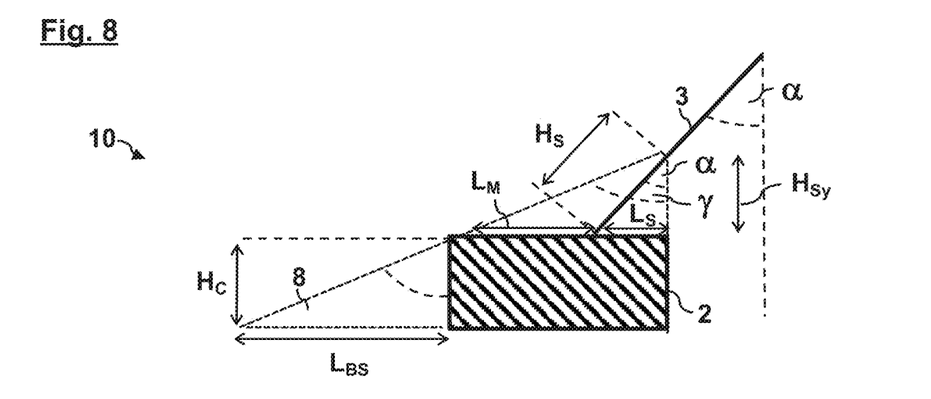
Figure 9:
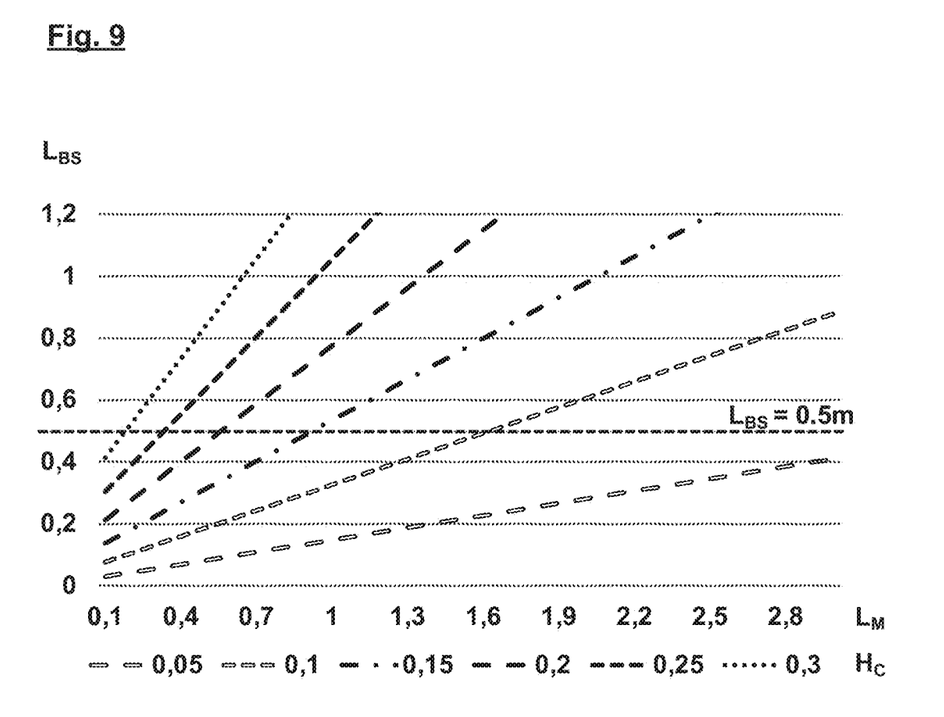
FIG. 9 shows a graph for the blind spot estimation of FIGS. 7 and 8.

FIGS. 7-9 provide examples on how to estimate this blind spot region 8 by calculating a blind spot length $L_{BS}$, which is the maximum protruding length of the part of the overhanging cargo 2 that is not visible for the sensor system 1.

The blind spot region 8 is basically defined by the angle $\gamma$ of the distal cargo end with respect to the camera 1a (see FIG. 7 for example). This angle can be calculated as:

$$\tan(\gamma) = (L_M + L_S)/H_{Sy} = (L_M + H_S * \sin(\alpha)/H_S * \cos(\alpha)$$

The blind spot length $L_{BS}$ can then be determined as:

$$L_{BS} = \tan(\gamma) * H_C H_S * \sin(\alpha)/H_S * \cos(\alpha)$$

An upper limit on the total vehicle length can then be estimated as:

$$L_2 = L_1 + L_{OV} + L_{BS}$$

This may then be used for the parking assistant 13 or other applications of the vehicle 10 for an improved consideration of the overhanging cargo 2.

FIG. 9 shows a graph for the maximum blind spot size $L_{BS}$ versus the measured cargo length $L_M$ for different cargo heights $H_C$. The height of the tailgate $H_T$ is assumed $1m$, the camera 1a distance to the tailgate's lower end $H_S$ 0.4 m. The measured cargo length and height influence the blind spot size/length. By measuring the cargo length and the tailgate opening angle $\alpha$, the system 7 can estimate the blind spot length. In a similar vein, a blind spot width may also be calculated. As an example, a limit of 0.5 for $L_{BS}$ is shown in FIG. 9, which may be used as an upper limit until which the system stays active and adds the expected maximum blind spot length $L_{BS}$ to the calculated total vehicle length $L_2$ to ensure safe parking operation. Blind spot lengths $L_{BS}$ above that limit may make it necessary to acquire further measurement data, e.g. from external systems, as the unknown length of the cargo 2 may be considered too large.

It is to be understood that the calculated examples may highly depend on the sensor position $H_S$ and the tailgate height $H_T$. Thus, by adjusting these parameters, a larger spread of suitable cargo dimensions may be measured while keeping the same $L_{BS}$ threshold.

Figure 10:
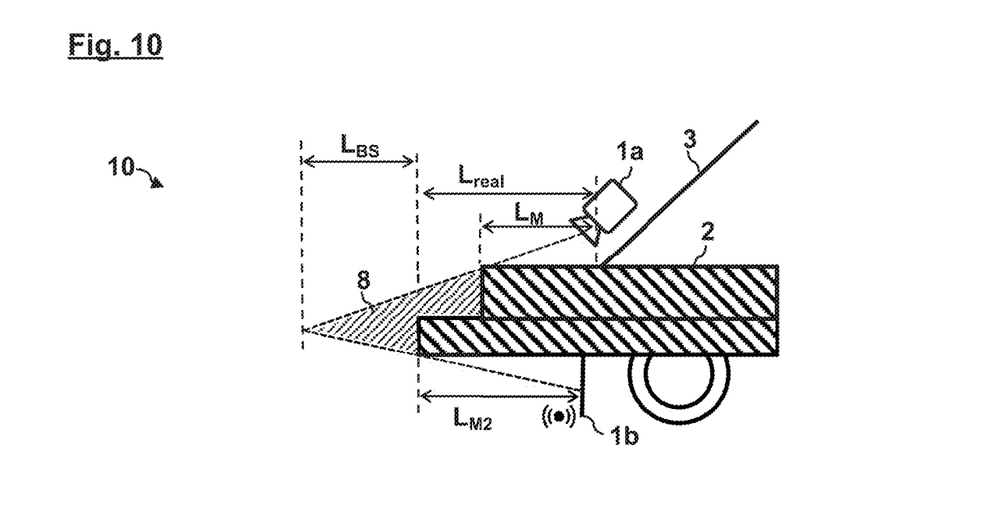
FIG. 10 shows an example for an improved blind spot estimation for the vehicle of FIG. 7.

Besides supplementary external measurements, the blind spot area may also be significantly lowered by using additional sensors on the vehicle, as the embodiment of FIG. 10 shows. The measurement area and usability are thereby increased.

FIG. 10 shows an example for an improved blind spot estimation for the vehicle 10 of FIG. 7.

In this example, an additional sensor, namely a radar 1b, is integrated at or close by the bumper 15 of the vehicle 10 to measure a lower side of the cargo 2 and thereby reduce or eliminate the blind spot region 8 as far as possible. For example, an ultra-short-range radar or similar may be employed to measure the length of the lower part of the cargo $L_{M2} = L_{Mreal}$. The blind spot length $L_{BS}$ can be calculated in analogue to the calculation described with reference to FIGS. 6 and 7.

It should be noted here that $L_{M2}$ is not necessarily equal to $L_{Mreal}$ in other embodiments, contrary to the above example. In one such example, three pieces of cargo may be stacked on top of each other, wherein the one in the middle may be the longest piece and thus may have the largest protrusion length with respect to the tailgate. The field of view of a sensor above the cargo, e.g. a camera on the tailgate as in FIG. 10, may then be blocked by the uppermost piece of cargo. The field of view of a sensor below the cargo, e.g. a radar at the bumper as in FIG. 10, may be blocked by the lowest piece of cargo. Hence, a blind spot region may remain in this particular example for the piece in the middle such that the protrusion length of the piece of cargo in the middle may not be fully determined by a combination of data from both sensors. However, this remaining blind spot length typically should be significantly smaller and could be estimated in a similar vein as detailed above for FIG. 8 (and/or may be determined by additional integrated or external sensors).

Thus, for a final verification of the measured cargo overhang, car to car or infrastructure information may be required in certain cases, e.g. in case the longest piece of cargo is neither on the top nor bottom of the cargo stack but in the middle.

The system 7 may proceed in roughly three steps. First, a tailgate sensor (e.g. the camera 1a in FIGS. 6-8) may be used to calculate the tailgate protrusion length $L_T$ (in case that the tailgate is determined to be open). If the cargo 2 is not protruding over this distance, then $L_T$ may be added to the vehicle length $L_1$ and the parking assistant 13 may be adjusted accordingly. Second, the sensor on the tailgate 3 and/or an optional sensor at the bumper 15 (e.g. the radar 1b in FIG. 10) may be used to measure the cargo overhang and estimate the blind spot region 8 in case that the cargo 2 is protruding over the tailgate 3 (i.e. $L_M>0$). The vehicle length $L_1$ may then be increased by $L_T$, the measured protrusion length $L_M$ and the estimated blind spot length $L_{BS}$. This result may be used as long as $L_{BS}$ stays below a certain threshold, e.g. 0.5 m as in FIG. 9. In the case where $L_{BS}>0.5$ m, which means that the part of the overhanging cargo 2 concealed from the sensor system 1 of the vehicle 10 is rather large/long, then an external measurement by other vehicles or the infrastructure may be requested (which may also be done irrespective of the value for $L_{BS}$).

In the foregoing detailed description, various features are grouped together in one or more examples with the purpose of streamlining the disclosure. It is to be understood that the above description is intended to be illustrative, and not restrictive. It is intended to cover all alternatives, modifications, and equivalents of the different features and embodiments. Many other examples should be apparent to one having ordinary skill in the art upon reviewing the above specification. The embodiments were chosen and described in order to explain the principles of the disclosure and its practical applications, to thereby enable others having ordinary skill in the art to utilize the disclosure and various embodiments with various modifications as are suited to the particular use contemplated.

REFERENCE LIST

1 sensor system
1a camera
1b radar
1c ultrasonic sensor
1d lidar
1e sensor control unit
1f angle sensor
2 overhanging cargo
3 tailgate
4 control device
5 communication device
6 driver interface
7 cargo detection system
8 blind spot region
9 external measuring entity
10 motor vehicle
11 obstacle
12 trunk
13 parking assistant
14 determination unit
15 bumper
$H_T$ tailgate height
$H_S$ height of sensor on tailgate
$H_C$ cargo height
$H_{sy}$ height of sensor above cargo
$L_M$ protrusion length measured by sensor above cargo
$L_{M2}$ protrusion length measured by sensor below cargo
$L_{BS}$ blind spot length
$L_B$ bumper length
$L_1$ vehicle length without cargo
$L_2$ total vehicle length with cargo
$L_{OV}$ protrusion length of cargo
$L_T$ tailgate protrusion length
$L_C$ distance open tailgate to trunk
$L_{Mreal}$ real protrusion length of cargo with respect to tailgate
$L_S$ length of sensor above cargo
α opening angle of tailgate
γ angle of distal cargo end
M method
M1-M5 method steps

The invention claimed is:

1. A cargo detection system for detecting overhanging cargo on a motor vehicle, the cargo detection system comprising:
    a sensor system configured to provide cargo measurement data for cargo loaded onto the motor vehicle by measuring at least one of exterior dimensions of cargo protruding over an outer edge of the motor vehicle and/or an opening condition of a tailgate of the motor vehicle; and
    a control device configured to assess, based on the cargo measurement data of the sensor system, whether cargo is overhanging from the motor vehicle and to calculate an updated vehicle length and/or vehicle width for the motor vehicle accounting for the overhanging cargo,
    wherein the control device is configured to estimate a blind spot region at a distal end of the overhanging cargo, based on a field of view of the sensor system, and to add a corresponding blind spot extension to the updated vehicle length and/or vehicle width.

2. The cargo detection system according to claim 1, wherein the sensor system is configured to measure the exterior dimensions of cargo protruding over at least one of a cargo area, a trunk, a tailgate, and/or a bumper of the motor vehicle.

3. The cargo detection system according to claim 1, wherein the opening condition comprises an opening angle (x) of the tailgate.

4. The cargo detection system according to claim 1, wherein the sensor system comprises at least one of a camera, a radar, an ultrasonic sensor, and/or a lidar.

5. The cargo detection system according to claim 1, wherein the sensor system is mounted at least of one of the cargo area, the trunk, the tailgate, and/or the bumper of the motor vehicle.

6. The cargo detection system according to claim 1, wherein the sensor system is configured to measure a protrusion length ($L_{OV}$) of the overhanging cargo of at least up to 3m and/or a protrusion width of the overhanging cargo of at least up to 1.5m.

7. The cargo detection system according to claim 1, further comprising:
    a communication device configured to receive cargo measurement data recorded by an external measuring entity for the cargo loaded onto the motor vehicle via vehicle-to-everything (V2X) communication.

8. The cargo detection system according to claim 1, further comprising:
    a driver interface configured to provide a cargo advice signal based on the updated vehicle length and/or vehicle width.

9. A motor vehicle comprising a cargo detection system according to claim 1.

10. The motor vehicle according to claim 9, further comprising:
    a parking assistant configured to use the updated vehicle length and/or vehicle width as input.

11. A method for detecting overhanging cargo on a motor vehicle, the method comprising:

measuring, by at least one of a sensor system of the motor vehicle and/or an external measuring entity, at least one of exterior dimensions of cargo protruding over an outer edge of the motor vehicle, and/or an opening condition of a tailgate of the motor vehicle;

assessing, by a control device of the motor vehicle, based on the cargo measurement data, whether cargo is overhanging from the motor vehicle; and calculating, by the control device of the motor vehicle, at least one of an updated vehicle length and/or an updated vehicle width for the motor vehicle accounting for the overhanging cargo, wherein the control device estimates a blind spot region at a distal end of the overhanging cargo, based on a field of view of the sensor system, and adds a corresponding blind spot extension to at least one of the updated vehicle length and/or the updated vehicle width.

12. The method according to claim 11, wherein the sensor system measures the exterior dimensions of cargo protruding over at least one of a cargo area, a trunk, a tailgate, and/or a bumper of the motor vehicle.

13. The method according to claim 11, wherein the opening condition comprises an opening angle of the tailgate.

14. The method according to claim 11, wherein the sensor system measures a protrusion length ($L_{OV}$) of at least one of the overhanging cargo of at least up to 3m and/or a protrusion width of the overhanging cargo of at least up to 1.5m.

15. The method according to claim 11, further comprising:

receiving, by a communication device of the motor vehicle, cargo measurement data recorded by the external measuring entity for the cargo loaded onto the motor vehicle via vehicle-to-everything (V2X) communication.

16. The method according to claim 11, further comprising:

providing, by a driver interface of the motor vehicle, a cargo advice signal based on at least one of the updated vehicle length and/or the updated vehicle width.

17. The method according to claim 11, wherein at least one of the updated vehicle length and/or the updated vehicle width is used as input for a parking assistant of the motor vehicle.

* * * * *